Patented Apr. 15, 1941

2,238,826

UNITED STATES PATENT OFFICE 2,238,826

MONACYL ETHENONES AND A PROCESS OF MAKING THEM

John Carl Sauer, Wilmington, Del., assignor to E. I. du Pont de Nemours & Company, Wilmington, Del., a corporation of Delaware No Drawing. Application October 13, 1938, Serial No. 234,844

11 Claims. (Cl. 260—550)

This invention has as an object the provision of a process for the preparation of monacyl ethenones. Another object is the provision of a process for the preparation of novel ethenones. A further object is the provision of intermediates for the preparation of beta-ketonic esters, amides, and other chemical compounds. Other objects will appear hereinafter.

The objects of the invention are accomplished by reacting a mixture of at least two primary monoacyl halides (which, except for the acid halide group, are chemically unaffected by tertiary amines, acid halides, and ethenones at temperatures up to 170° C.), under anhydrous conditions, with a saturated tertiary aliphatic amine free of active hydrogen and having any pair of nitrogens separated by a chain of at least two carbon atoms, and thereafter isolating, also under anhydrous conditions, the substituted ethenone or ethenones obtained. There is thus effected an intermolecular dehydrohalogenation of the acyl halides with formation of a mixture of products comprising one or more new compounds of the probable formula

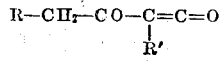

wherein R is an organic radical, preferably hydrocarbon, free of groups reactive at 170° C. with tertiary amines, acid halides and ethenones, and R' is different from R and is hydrogen or an organic radical, preferably hydrocarbon, free of groups reactive up to 170° C. with tertiary amines, acid halides and ethenones.

When higher substituted ethenones (i. e., the ethenones derived from mixtures of acyl halides each having 8 or more carbons) are desired, the preferred method consists in dissolving chemically equivalent amounts of at least two acyl halides in an inert solvent such as ether, adding sufficient tertiary amine to dehydrohalogenate all the acyl halide present (or the reverse procedure can be employed, i. e., the acyl halide mixture can be added to the amine), and quickly closing the reaction vessel to avoid contact with moisture. The contents of the reaction vessel are agitated and, if necessary, cooled to offset any heat of reaction. This procedure is convenient, and the only apparatus required is a reaction vessel provided with agitation means.

At 0–25° C., the time required for complete reaction varies from 1 to 16 hours, depending on the acyl halide and amine used. Dehydrohalogenation is usually complete in an hour at room temperature when trimethylamine is employed, or in 30 minutes when the reaction is carried out in refluxing benzene or xylene with a trialkylamine such as triethylamine. Higher temperatures promote an even more rapid reaction. The higher substituted ethenones are conveniently purified by fractional recrystallization, and distillation is usually unnecessary.

On the other hand, the lower acyl halides, such as propanoyl chloride, are very reactive toward tertiary aliphatic amines and are best dehydrohalogenated under a reflux condenser by adding the amine to a solution of the acyl halide mixture (or vice versa) just fast enough to keep the solvent gently refluxing. The mixture of lower acyl halides is completely dehydrohalogenated with trimethylamine within a few minutes at room temperatures.

A suitable method for determining when the reaction has gone to completion is merely to filter a small portion of the reaction mixture and boil a drop or two of trialkylamine with the filtrate. The reaction is complete when no precipitate appears.

The precipitated amine hydrochloride is preferably isolated by indirect filtration, employing nitrogen pressure to avoid contact with air, and the filtrate is concentrated by distillation. Ordinary direct filtration can be employed but requires pains-taking exclusion of moisture. The residue, consisting of a mixture of substituted ethenones, is fractionally distilled in the case of the lower substituted ethenones, or fractionally crystallized in the case of the higher substituted ethenones, to separate the mixture into its individual components. The reaction product is a mixture, in varying amounts, of compounds of the probable formula R—CH$_2$COC(R')CO, wherein R and R' are hydrogen or monovalent organic radicals representing in any instance either of the acid halide residues R and R' of the acid halides RCH$_2$COX and R'CH$_2$COX, provided that, when R' is an organic radical, R is also an organic radical. R and R' are both hydrogen only when acetyl chloride is a component of the reaction. Of these, only the compounds in which R and R' are different, come within the scope of the present invention.

The more detailed practice of the invention is illustrated by the following examples, wherein parts given are by weight. There are of course many forms of the invention other than these specific embodiments.

EXAMPLE I

Dodecanoylethenone

In a reaction vessel equipped with a stirrer, reflux condenser and a device for slow introduction of liquid are added anhydrous ether (800 parts), dodecanoyl chloride (218 parts, 1.0 mol) and acetyl chloride (78 parts, 1.0 mol). Triethylamine (206 parts, 2.0 mols) is added dropwise over a period of 30 minutes, with stirring, after which the mixture is stirred for an additional two hours. The vessel is then left standing at room temperature for 18 hours, and the triethylamine hydrochloride is removed by filtration. The ether is next distilled from the filtrate, and the residue is fractionated under reduced pressure. Acetylethenone (12 parts), boiling at 40–60° C./15–50 mm., is obtained as one of the symmetrical products. The next fraction, dodecanoylethenone, distills at 130–170° C./4–20 mm. and amounts to 25 parts. The residue is dodecanoyldecylethenone, which after being purified by recrystallization from acetone, melts at 41° C., and consists of 50 parts.

Of the above pure products, only dodecanoylethenone, the unsymmetrical ethenone, comes within the scope of the present invention. The products are characterized as indicated below:

*Acetylethenone (symmetrical product).*—Acetylethenone is characterized by reacting it with aniline. The resulting acetoacetanilide melts at 83–4° C., and a mixed melting point determination with an authentic sample of acetoacetanilide shows no depression. This fraction is then the compound of the probable formula $$CH_3CO-CH=C=O$$

*Dodecanoylethenone (unsymmetrical product).*—This product is found on analysis to have 75.4% carbon and 11.7% hydrogen, whereas the amounts calculated for a compound of the formula $C_{14}H_{24}O_2$ are 75.0% and 10.8%, respectively. Reaction of this unsymmetrical ethenone with aniline gives crude dodecanoylacetanilide melting at 54–7° C., and having on analysis 4.6% nitrogen as compared to the calculated amount of 4.5% for a compound $C_{20}H_{31}O_2N$. The anilide is further characterized by converting it into an orange dye with p-nitrophenyldiazonium chloride, which dye on analysis has the calculated amount of nitrogen (12.0%) for a compound of the formula $C_{26}H_{34}O_4N_4$. This fraction is thus dodecanoylethenone of the probable formula $C_{10}H_{21}CH_2CO-CH=C=O$. The latter series of reactions shows the compound must be dodecanoylethenone and not acetyldecylethenone.

*Dodecanoyldecylketene (symmetrical product).*—The residue is found on analysis to contain 78.8% carbon and 12.2% hydrogen, and to have a molecular weight of 351. The calculated values for a compound of the formula $C_{24}H_{44}O_2$ are 79.1%, 12.5%, and 364, respectively.

EXAMPLE II

Dehydrohalogenation of Propanoyl Chloride-Octanoyl Chloride Mixture

In an apparatus similar to that described in Example I is placed anhydrous ether (650 parts), propanoyl chloride (73.6 parts, 0.8 mol), and octanoyl chloride (129.6 parts, 0.8 mol). Triethylamine (165 parts, 1.6 mols) is added dropwise with stirring over a period of 30 minutes. After standing 16 hours at room temperature, the theoretical amount of triethylamine hydrochloride has precipitated and is removed by filtration. After distilling the solvent from the filtrate, the residue is fractionated under diminished pressure with the results shown in Table I below:

Table I

| Fraction | B. P., °C. Mm. | Weight Parts | Product | Yield Percent |
|---|---|---|---|---|
| 1 | 50–76/12 | 12 | Propanoylmethylethenone. | 28 |
| 2 | 124–5/14 | 33 | Unsymmetrical etnenone, $C_{11}H_{18}O_2$. | 26 |
| 3 | 107–42/2 | 31 | Octanoylhexylethenone. | 31 |

The products of the reaction are characterized as follows:

*Propanoylmethylethenone (symmetrical product).*—Fraction 1 is found on analysis to contain 63.9% carbon and 7.3% hydrogen, and to have a molecular weight of 114 and an index of refraction, $$N_D^{25}, \text{ of } 1.4280$$

A compound of the formula $C_6H_8O_2$ has calculated carbon and hydrogen contents of 64.3% and 7.15%, respectively, and a calculated molecular weight of 112.

*Unsymmetrical ethenone.*—Fraction 2 is found to have 72.2% carbon, 9.85% hydrogen, a molecular weight of 172, and $$N_D^{25}, 1.4457$$

A compound of the formula $C_{11}H_{18}O_2$ has calculated carbon and hydrogen contents of 72.5% and 9.9%, respectively, and a calculated molecular weight of 182. Addition of excess gaseous ammonia causes ready precipitation of an amide, melting at 100–101° C., which from its nitrogen content of 7.5% must be derived from a product of the formula $G-CH_2COC(G)CO$ in which the G's are different groups representing the acid halide residues and having together 7 carbon atoms. The amide is further identified (and with it the ethenone from which it is made) by the fact that it can be saponified and decarboxylated in known manner to ethylheptyl ketone whose semicarbazone is found to melt at 100–101° C. Michael (J. Am. Chem. Soc. 41, 318, 1919) reports the melting point of this semicarbazone as 101° C.

*Octanoylhexylethenone (symmetrical product).*—Fraction 3 is found on analysis to contain 76.3% carbon and 11.2% hydrogen, and to have a molecular weight of 235 and an index of refraction, $$N_D^{25}, 1.4489$$

A compound of the formula $C_{16}H_{28}O_2$ has calculated carbon and hydrogen contents of 76.2% and 11.1%, respectively, and a calculated molecular weight of 252.

EXAMPLE III

Dehydrohalogenation of Propanoyl Chloride-Hexanoyl Chloride Mixture

In an apparatus similar to that described in Example II is placed anhydrous petroleum ether (650 parts) and triethylamine (133 parts, 1.3 mols). A mixture of propanoyl chloride (70 parts, 0.75 mol) and hexanoyl chloride (86 parts, 0.64 mol) is added dropwise with stirring over a period of one hour and at a temperature of 20–25° C. After standing 24 hours at room temperature, the precipitated triethylamine hydrochloride is removed by filtration. After distilling the solvent from the filtrate, the residue is fractionated under diminished pressure with the results shown in Table II below:

Table II

| Fraction | B. P., °C. | Weight | Product | Yield |
|---|---|---|---|---|
| | Mm. | Parts | | Percent |
| 1 | 70–75/30 | 14 | Propanoylmethylethenone. | 36 |
| 2 | 111–6/30 | 22 | Unsymmetrical ethenone, $C_9H_{14}O_2$. | 44 |
| 3 | 135–148/30 | 17 | Hexanoylbutylethenone. | 27 |

The products of the reaction are characterized as follows:

*Propanoylmethylethenone (symmetrical product).*—Fraction 1 is found on analysis to contain 63.9% carbon and 7.3% hydrogen, and to have a molecular weight of 114 and an index of refraction, $N_D^{25}$, of 1.4280

A compound of the formula $C_6H_8O_2$ has calculated carbon and hydrogen contents of 64.3% and 7.15%, respectively, and a calculated molecular weight of 112.

*Unsymmetrical ethenone.*—Fraction 2 is found to have 69.3% carbon, 9.8% hydrogen, a molecular weight of 144, and an index of refraction, $N_D^{25}$, of 1.4417

A compound of the formula $C_9H_{14}O_2$ has calculated carbon and hydrogen contents of 69.6% and 9.7%, respectively, and a calculated molecular weight of 154. Addition of excess gaseous ammonia causes ready precipitation of an amide, melting at 102–103° C., which, from its nitrogen content of 8.3%, must be derived from a product of the formula G—$CH_2COC(G)CO$, in which the G's are different groups representing the acid halide residues and having together five carbons. The amide formed from this unsymmetrical ethenone has a theoretical nitrogen content of 8.2%.

*Hexanoylbutylethenone (symmetrical product).*—Fraction 3 is found on analysis to have a molecular weight of 198 and an index of refraction, $N_D^{25}$, of 1.4478

A compound of the formula $C_{12}H_{20}O_2$ has a calculated molecular weight of 196.

A most important condition of the present process is that it must be carried out in toto (both reaction and isolation of products) under anhydrous conditions.

Any solvent which dissolves and is inert, under the conditions of the process, towards acyl halides, tertiary amines, and ethenones may be used. Thus a wide variety of solvents, including ethers, aromatic or aliphatic hydrocarbons, aromatic or aliphatic chlorinated hydrocarbons containing inactive halogen atoms, such as trichloroethylene, tetrachloroethylene, or carbon tetrachloride, is suitable. Chlorinated hydrocarbons not suitable as solvents include benzyl chloride and alpha- or beta-chloroethers. In those cases where the substituted ethenones are isolated by distillation, it is most convenient to choose a solvent boiling either considerably below or above the substituted ethenones, thereby facilitating the separation of the product from the solvent. Such a choice is especially beneficial in preparing and isolating the lower substituted ethenones when distillation is used in the separation. Specific suitable solvents include ligroin, benzene, toluene, xylene, chlorobenzene, o-dichlorobenzene, diethyl ether, dibutyl ether, chloroform, carbon tetrachloride and trichloroethylene. The amount of solvent may be varied within wide limits. Using 100–200 cc. solvent per 0.1 gram mol of each reactant has been found satisfactory. The amount of solvent used should be sufficient to dissolve the substituted ethenones, thus facilitating the separation of the insoluble tertiary amine hydrochloride by filtration. It is also feasible to use an excess of the amine as solvent in cases where the substituted ethenone can be readily separated from the amine. For those uses of ethenones in which the presence of the amine hydrochloride does no harm, the dehydrohalogenation can be carried out in the absence of a solvent.

A wide temperature range for the reaction is also permissible, the process having been applied successfully at temperatures ranging from 0° C. to 140° C. The higher temperatures promote a more rapid reaction. The process is ordinarily carried out at atmospheric pressure (about 760 mm.), but operation at pressures above or below atmospheric is feasible.

The process of the present invention is generically applicable to a mixture of at least two different primary monoacyl halides R'—$CH_2CO$—X, where X is any halogen and R' is hydrogen or a monovalent organic radical which is chemically inert at temperatures up to 170° C. to tertiary amines, acid halides and ethenones. R' is preferably a hydrocarbon radical such as aryl, aralkyl, cycloalkyl, and open-chain alkyl (especially alkyl) but may contain inert groups such as carbalkoxy, alkoxy, araloxy, aralkoxy, keto, tertiary amide, halogen attached to aromatic carbon, or aliphatic heterocyclic groups. By the latter is meant heterocyclic radicals not having benzene-type unsaturation, which is commonly represented by three or more alternating double bonds in a ring structure. The heterocyclic radical may thus be saturated or unsaturated. Types of radicals which should not be present are aromatic heterocyclic radicals, amide groups having amido hydrogen, and acyloxy groups. Suitable specific halides include the following: n-dodecanoyl, n-decanoyl, n-nonanoyl, n-octanoyl, n-hexanoyl, 9,10-octadecenoyl (oleyl), linoleyl, n-heptanoyl, 3-methylbutanoyl, n-butanoyl, propanoyl, acetyl, 4-phenoxybutanoyl, 5-(2,3,5-trichlorophenoxy) pentanoyl, 5-ketooctanoyl, furyldecanoyl, delta-carbmethoxypentanoyl, delta-methoxypentanoyl, 3-phenylpropanoyl, octadecanoyl, hexadecanoyl, tetradecanoyl, and cyclohexylacetyl chlorides. The corresponding bromides, iodides, and fluorides are also suitable for the reaction. Mixtures of fatty acid halides derived from the mixture of fatty acids obtained by saponification of fatty oils provide a convenient source of mixed halides.

The amine component of the reaction may be any tertiary, saturated, mono- or polyamine free from active hydrogen (i. e., hydrogen which is joined to an inorganic element, e. g., O,S,Se,Te,N,P,As) in which all the radicals attached to the amino nitrogen or nitrogens are aliphatic in character; or, more simply, saturated tertiary aliphatic amines free of active hydrogen. In the case of polyamine any pair of nitrogens must be separated by a chain of at least two carbon atoms. Saturated tertiary acyclic amines free of active hydrogen are preferred. Specific suitable amines includes trimethylamine, triethylamine, tri-n-propylamine, methyldiethylamine, benzyl-N,N-dimethylamine, ethylmethylpropylamine, 1-ethylpiperdine, 1-isopropylpiperidine, 1-methylhexahydroazepine, 1-methylpyrrolidine, N,N,N',N'-tetramethylethylenediamine, N-methylmorpholine, N-ethylthiomorpholine, cyclohexyl-N,N-diethylamine, 1,6-bis(dimethylamino)hexane, 1,3-di(1-piperidyl)-propane, and 1,4-bis(diethylamino)butane. Pyridine, di-1-piperdylmethane, bis(dimethylamino)methane, and dimethylaniline do not dehydrohalogenate the above described acyl halides under the conditions used.

Usually chemically equivalent amounts of trialkylamine and acyl halide are used. An excess of amine or of acyl halide may be employed, but this may introduce some difficulty in isolating the products. The acyl halides can be present in any molar ratio to each other.

On the basis of the reactions they undergo, the products of the present invention are considered to be substituted ethenones and to have the following probable formula in which R and R' have the values hereinbefore given:

RCH$_2$COC(R')CO

Two mechanisms which may account for the production of substituted ethenones by the reaction of a primary acid chloride and a tertiary amine are given in the following series of equations:

(1) 2RCH$_2$COCl+2R'$_3$N→
    2R—CH=C=O+2R'$_3$N.HCl
    2R—CH=C=O→RCH$_2$COC(R)=C=O or (2) RCH$_2$COCl+R'$_3$N→RCH=C=O+R'$_3$N.HCl
    RCH=C=O+RCH$_2$COCl→
    RCH$_2$COCHRCOCl
    RCH$_2$COCHRCOCl+R'$_3$N→
    RCH$_2$COC(R)=C=O+R'$_3$N.HCl

The exact course of the reaction cannot be predicted on the basis of known facts. In view of this, the products for absolute accuracy must at present be defined as the intermolecular dehydrohalogenation products of at least two primary monoacyl halides of the type hereinbefore given.

When a mixture of acyl halides is dehydrohalogenated, the formation of four different substituted ethenones is theoretically possible. The formation of these four products may be explained on the basis of either of the two mechanisms proposed above. Using the first of the above mechanisms, the reactions involved when a mixture of two primary acyl halides is dehydrohalogenated may be as follows:

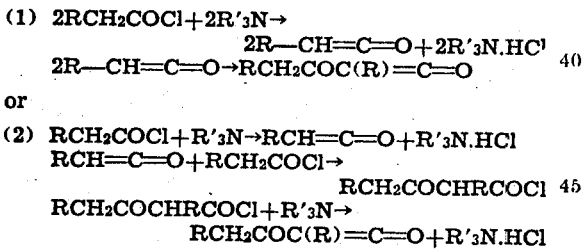
RCH$_2$COCl+R''$_3$N→RCHCO ("A")
R'CH$_2$COCl+R''$_3$N→R'CHCO ("B")
2A→RCH$_2$COC(R)CO (symmetrical product)
2B→R'CH$_2$COC(R')CO (symmetrical product)
A+B→RCH$_2$COC(R')CO (unsymmetrical product, "C")
B+A→R'CH$_2$COC(R)CO (unsymmetrical product, "D")

The symmetrical products are disclosed in greater detail and claimed in my application Serial No. 234,183, filed of even date herewith.

The unsymmetrical products are the subject of the present invention.

The dehydrohalogenation of more than two primary acyl halides theoretically gives additional symmetrical and unsymmetrical ethenones. The following table shows the number of symmetrical and unsymmetrical products theoretically possible when a mixture of n-acyl halides is dehydrohalogenated.

| Acyl halides | Symmetrical products | Unsymmetrical products | Total |
|---|---|---|---|
| 2 | 2 | 2 | 4 |
| 3 | 3 | 6 | 9 |
| 4 | 4 | 12 | 16 |
| n | n | n(n-1) | n$^2$ |

These substituted ethenones may be used in the preparation of unsymmetrical ketones, substituted beta-ketoamides, anilides, and esters. Certain of these ethenones, as well as their derivatives, have proved useful as dye intermediates. The higher molecular weight substituted ethenones are particularly useful for imparting desirable properties to fibrous materials, as is disclosed and claimed in copending application Serial No. 234,842 filed October 13, 1938, by W. E. Hanford. Thus, substituted ethenones prepared from mixtures containing octanoyl and higher molecular weight acyl halides impart both waterproofing and softening effects to such materials. With substituted ethenones of lower carbon content, the outstanding change in properties is a favorable alteration of dyeing characteristics.

In the specification and claims the term "primary monoacyl halide" is used to designate a monoacyl halide in which the halide group is primary, i. e., attached to a methylene radical, thus, —CH$_2$—CO—X. The expression "hydrocarbon primary monoacyl halide" indicates that the —CH$_2$—CO—X group is attached to a hydrocarbon radical. The term "aliphatic carbon" is used to designate a non-aromatic carbon atom, i. e., a carbon which is not a part of an aromatic (including an aromatic heterocyclic) ring. It is thus used to designate a carbon which may be an open chain carbon, an alicyclic carbon, or an aliphatic heterocyclic carbon. As already explained, the term "active hydrogen" is used to indicate hydrogen joined to an inorganic element.

The term unsymmetrical ethenone is used to designate the intermolecular dehydrohalogenation products obtained from one mol of a primary monoacyl halide and one mol of a different primary monoacyl halide. The symmetrical ethenone is similarly the intermolecular dehydrohalogenation product of two molecules of the same primary monoacyl halide.

The above description and examples are intended to be illustrative only. Any modification of or variation therefrom which conforms to the spirit of the invention is intended to be included within the scope of the claims.

I claim:

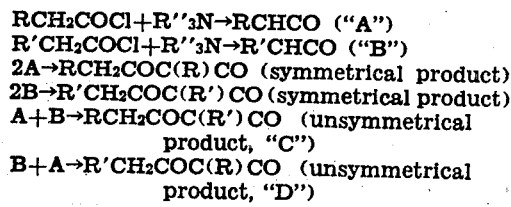
1. Process which comprises reacting, in an anhydrous solvent, under anhydrous conditions, a mixture of at least two primary monoacyl halides, each of which is free from groups reactive under the conditions of the dehydrohalogenation other than the one acyl halide group, with a saturated tertiary aliphatic amine free from active hydrogen and selected from the class consisting of monoamines and polyamines having any pair of nitrogens separated by a chain of at least two carbon atoms, and isolating, also under anhydrous conditions, an intermolecular dehydrohalogenation product of two different acyl halides.

2. Process which comprises reacting, in an anhydrous solvent, a mixture of at least two hydrocarbon primary monoacyl halides under anhydrous conditions with a saturated tertiary acyclic monoamine free of active hydrogen, and isolating, also under anhydrous conditions, an unsymmetrical ethenone.

3. Process which comprises reacting, in an anhydrous solvent, a mixture of primary fatty acid halides under anhydrous conditions with a saturated tertiary acyclic monoamine free of active hydrogen, and isolating, also under anhydrous conditions, an unsymmetrical ethenone.

4. An intermolecular dehydrohalogenation product of two different primary monoacyl halides.

5. An intermolecular dehydrohalogenation product of two different primary hydrocarbon monoacyl halides.

6. An intermolecular dehydrohalogenation product of two different primary fatty acid halides.

7. An acyl ethenone of the probable formula $RCH_2—CO—C(R')=CO$ wherein R is an organic radical free of groups reactive under the conditions of the dehydrohalogenation, and R' is different from R and is chosen from the class consisting of hydrogen and organic radicals free of groups reactive at 170° C. with acyl halides, ethenones and tertiary amine, said ethenone being substantially identical with that obtained by reacting, under anhydrous conditions, a mixture of at least two primary monoacyl halides, each of which is free from groups reactive under the conditions of dehydrohalogenation other than the one acyl halide group, with a saturated tertiary aliphatic monoamine, and isolating, also under anhydrous conditions, the ethenone.

8. An acyl ethenone of the probable formula $RCH_2—CO—C(R')=CO$ wherein R and R' are different monovalent organic radicals free of groups reactive under the conditions of the dehydrohalogenation, said ethenone being substantially identical with that obtained by reacting, under anhydrous conditions, a mixture of at least two primary monoacyl halides each of which is free from groups, other than the one acyl halide group, reactive with acyl halides, ethenones, and tertiary amines and isolating, also under anhydrous conditions, the ethenone.

9. The intermolecular dehydrohalogenation product of dodecanoyl chloride and acetyl chloride.

10. The intermolecular dehydrohalogenation product of propanoyl chloride and octanoyl chloride.

11. An intermolecular dehydrohalogenation product of the mixture of fatty acid halides derived from the mixture of fatty acids obtained by saponification of a fatty oil.

JOHN CARL SAUER.